United States Patent [19]

Kordis

[11] Patent Number: 5,320,214
[45] Date of Patent: Jun. 14, 1994

[54] SEALED LINEAR MOTION APPARATUS AND METHOD

[76] Inventor: Kevin A. Kordis, 2 Curtis St., Littleton, Mass. 01460

[21] Appl. No.: 57,643

[22] Filed: May 3, 1993

Related U.S. Application Data

[63] Continuation of Ser. No. 887,343, May 21, 1992, abandoned.

[51] Int. Cl.⁵ .............................................. B65G 15/60
[52] U.S. Cl. .................................... 198/837; 198/750; 198/836.1
[58] Field of Search ............... 198/836.1, 837, 836.2, 198/525, 750, 841

[56] References Cited

U.S. PATENT DOCUMENTS

| | | | |
|---|---|---|---|
| 4,140,217 | 2/1979 | Dell | 198/836.1 |
| 4,231,471 | 11/1980 | Gordon | 198/836.1 |
| 4,449,958 | 5/1984 | Conrad | 198/834 X |
| 4,545,290 | 10/1985 | Lieberman | 92/88 |
| 5,080,498 | 1/1992 | Tsukada | 384/15 |

FOREIGN PATENT DOCUMENTS

| | | | |
|---|---|---|---|
| 2416963 | 10/1975 | Fed. Rep. of Germany | 198/525 |
| 2510407 | 9/1976 | Fed. Rep. of Germany | 198/836.1 |
| 0123708 | 5/1988 | Japan | 198/836.1 |
| 0346909 | 4/1931 | United Kingdom | 198/836.1 |
| 1566549 | 5/1980 | United Kingdom | 198/836.1 |

OTHER PUBLICATIONS

"Linear Motion and Controls—Featuring Accel-Linear Sealed Systems," product catalog, 1992, pp. 35-37, 40-43.
"Divinalator Custom Conveyor Systems," product brochure, 1987.
"Presray Pneuma Seal," product catalog, 1991.

*Primary Examiner*—Cheryl L. Gastineau
*Attorney, Agent, or Firm*—Hamilton, Brook, Smith & Reynolds

[57] ABSTRACT

A sealed linear motion apparatus and method are disclosed. The moveable surface of the apparatus is sealed to side members spaced across the moveable surface and adjacent to the opposite sides of the moveable surface. The seal comprises sealing members which make contact with both the side members and the moveable surface. The sealing members are typically made from polyurethane impregnated with polytetrafluoroethylene. In one embodiment, the apparatus is used as a linear position table. A controlled motor precisely positions a plate mounted to the moveable surface. In another embodiment, the apparatus is used as a conveyor in which the moveable surface moves continuously in one direction at a constant rate of speed. Because the apparatus is sealed, it may be used in certain applications such as clean room environments and those requiring wash down of equipment with high pressure, high temperature liquid or environments with abrasive contaminants in the air.

23 Claims, 7 Drawing Sheets

SEALED LINEAR MOTION APPARATUS AND METHOD

This is a continuation of co-pending application Ser. No. 07/887,343 filed on May 21, 1992, abandoned.

BACKGROUND OF THE INVENTION

Linear motion systems such as positional tables, linear position slides and conveyor systems have various applications. These include different applications in the manufacturing, medical, and food industries. It is appreciated that within each of these industries, many environments are possible. For instance, in the manufacturing of semiconductor devices, clean room environments are very common. In the medical and food handling industries, cleanliness is of paramount importance. Therefore, it is commonly required that all equipment used in these industries be washed down periodically with high pressure, high temperature water. Consequently, the equipment used in these industries must tolerate the wash down.

Typically, linear position slides and conveyors involve high precision mechanical components. These components interact with each other in such a way as to cause friction between them. This friction can cause small particles of component material to be released from the mechanism. These particles may escape from the position system into the atmosphere. In applications such as clean room environments, these particles can adversely effect the processes being carried out by the applications.

The precision components in linear motion systems are typically made of materials which do not tolerate prolonged exposure to moisture (such as in a wash down) or contaminants, such as dirt or particles. Liquids or contaminants which come into contact with the system can cause serious permanent damage, such as shortening the life of the linear bearings, if they are allowed to contact the precision components.

Therefore, it is recognized that there exists a need for a linear motion system, such as a linear position slide or a conveyor, which is sealed to isolate its interior from its external environment. This seal should prevent particles from escaping from the system and should prevent liquids and particles from entering the system.

SUMMARY OF THE INVENTION

The present invention provides a linear motion apparatus and method. The apparatus comprises a moveable surface which moves along a lateral axis. The moveable surface has opposite sides adjacent to first and second side members. The side members extend along respective axes parallel to the lateral axis of the moveable surface. The sides of the moveable surface are sealed to the side members by a seal.

In a preferred embodiment, the moveable surface is the outer surface of an endless drive belt. The drive belt encloses a belt drive assembly which drives the belt. The drive belt has at least one timing belt attached to its inner surface to allow the belt drive assembly to drive the drive belt. Further, in this embodiment, a sealing member is attached to each of the side members. Each of the sealing members makes contact with the outer surface of the drive belt to form the seal. At least one sealing band is attached to the outer surface of the drive belt. The sealing band is attached such that each of the sealing members contacts the sealing band.

In one embodiment, there are two metallic sealing bands attached to the drive belt which make contact with the sealing members.

In one embodiment, the belt drive assembly comprises sliding blocks, commonly referred to as linear motion bearings, on rails. The blocks are attached through the drive belt to a plate on the moveable surface. The drive belt is driven by a drive motor coupled to a drive pulley which mates with the timing belt on the inner surface of the drive belt. Another pulley spaced from the drive pulley supports the drive belt and keeps it taut. The drive motor is controlled by a motor controller to provide precise linear movement of the plate. The drive motor may be a servo or stepper motor coupled to the pulley via gear reduction to allow for precise positioning. Thus, a linear position slide is provided in which the lateral axis position of any equipment or other items mounted to the plate may be precisely controlled.

In another embodiment, the belt drive assembly comprises pulleys at opposite ends of the assembly which mate with the timing belt on the inner surface of the drive belt. One of the pulleys is driven by a continuous speed drive motor. The drive belt is supported between the pulleys with rollers. Thus, a conveyor system is provided for transporting items on the moveable surface from one end of the conveyor to the other.

The sealed motion apparatus of the present invention provides certain distinct advantages over linear motion systems of the prior art. Because the present invention system is sealed, it may be used in applications like clean room environments in which particulates generated internal to the system must be prevented from escaping into the environment. A vacuum can be attached to the apparatus to remove these particulates. Also, the system can be used in the medical and food preparation industries. Because the system is sealed, the high pressure, high temperature water (liquids) used to wash down equipment in these industries will not penetrate the system and damage the internal components. The system may also be used in industries such as the garment industry where particles in the atmosphere would damage the system if allowed to penetrate to the internal components. Thus, the present invention provides extended life to linear motion systems used in these industries.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
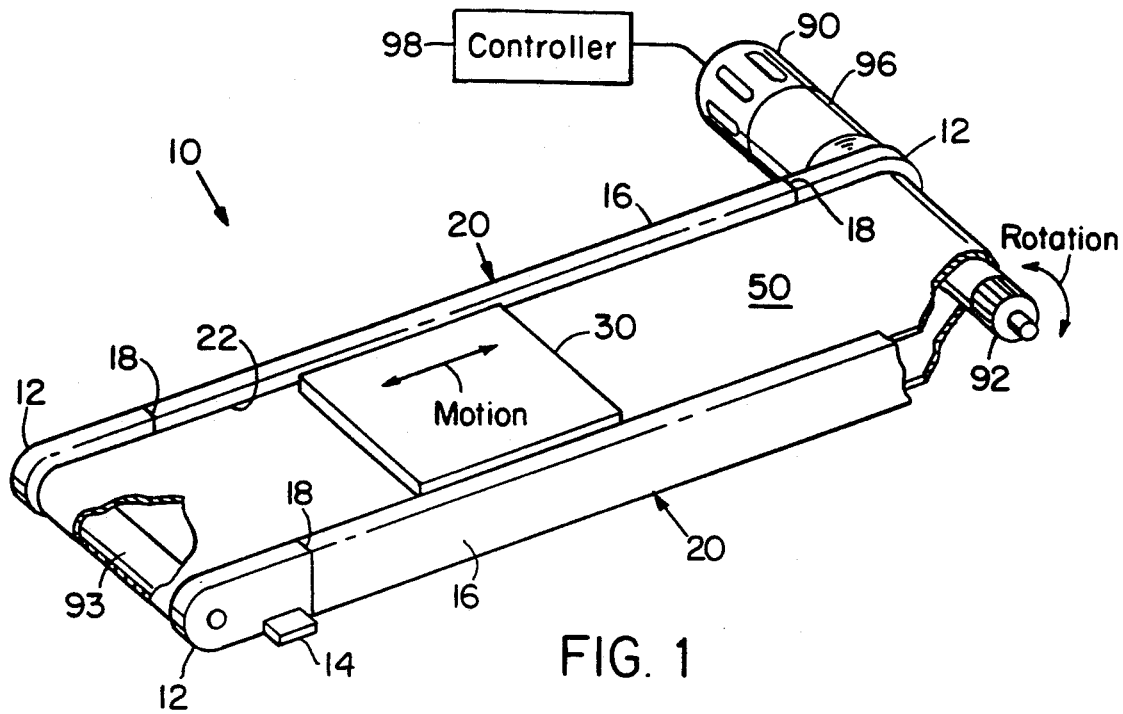
FIG. 1 is a perspective view of one embodiment of the present invention linear motion device with a portion broken away to show the drive shaft.

In FIG. 1, linear motion device 10, has two side section assemblies 20, each comprising two bearing endcaps 12 and one center section 16. In applications where linear motion device 10 must be water proof, joints 18 between bearing endcaps 12 and center sections 16 are sealed. Joints 18 are sealed either with a gasket or silicone or the like. Protruding from bearing endcaps 12 are foot mounts 14 which have bolt holes allowing linear motion device 10 to be secured in place. Bearing endcaps 12 can have tapped holes instead of foot mounts 14 for securing linear motion device 10. In the preferred embodiment, bearing endcaps 12 are anodized aluminum castings. In an alternative embodiment, bearing endcaps 12 can be made of stainless steel or can be machined from a solid block. Center section 16 in the preferred embodiment is an anodized aluminum extrusion. In an alternative embodiment, center section 16 can be made of stainless steel or can be machined from a solid block.

The two side section assemblies 20 are spaced apart from each other. An endless drive belt 50 is located between the side section assemblies 20. Drive belt 50 encircles the interior components of linear motion device 10. Sliding block plate 30 provides a surface mounted on top of drive belt 50. In the preferred embodiment, an additional mounting plate is fastened on top of sliding block plate 30. Sliding block plate 30 is where tooling is located or where loads which require precision positioning are carried. Joint 22 is the area where side section assemblies 20 meet the side edges of drive belt 50. Joint 22 is sealed to prevent liquids and other contaminants from entering the interior of linear motion device 10 as discussed later.

Figure 13:
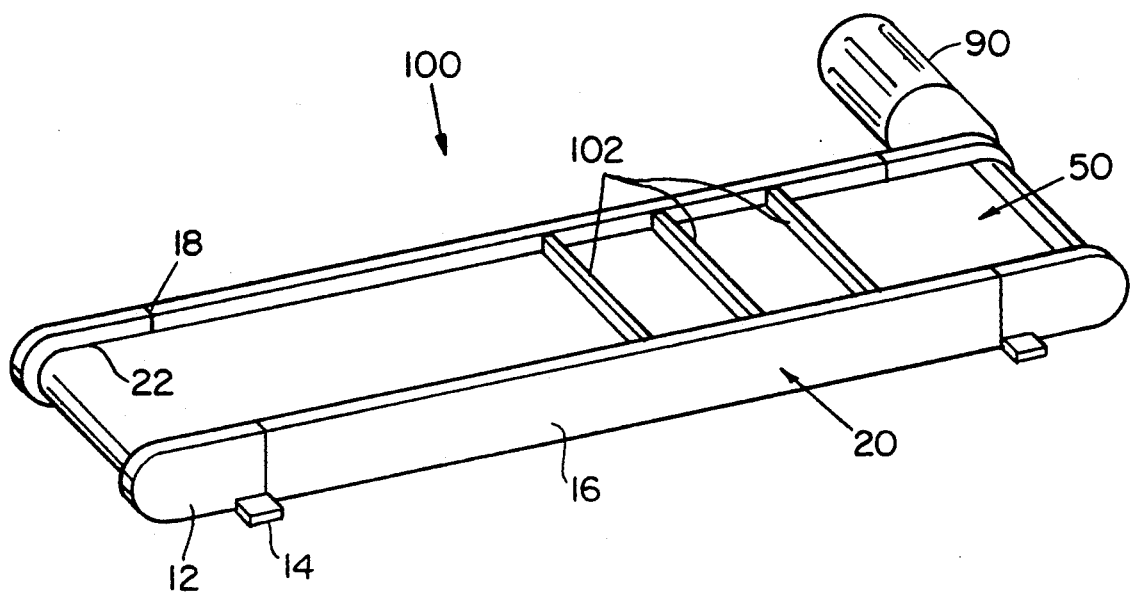
FIG. 13 is a perspective view of a sealed conveyor of the present invention.

Drive motor 90 is mounted to linear motion device 10 at bearing endcap 12 of one end of the device 10. Drive motor 90 rotates drive shaft 92 which in turn moves drive belt 50. Drive belt 50 transforms rotational motion from drive shaft 92 into linear movement of sliding block plate 30 along a lateral axis as indicated by the arrow labelled "motion" in FIG. 1. Sliding block plate 30 is driven forwards and backwards by reversing the rotational direction of drive motor 90. Drive motor 90 is attached directly to the device 10. Alternatively, drive motor 90 can be located remotely, transmitting power by means of a pulley system. Drive motor 90 is generally a stepping motor. Alternatively, drive motor 90 can be an AC servo motor, or a DC servo motor, and in cases where the present invention is used as a conveyor (as seen in FIG. 13), a single speed AC motor can be used. Generally, the size of drive motor 90 ranges from a fractional horse power motor up to a five horse power motor depending on the use of device 10 and loads to be carried thereby.

In the preferred embodiment, a gear reducer 96 is used to reduce the revolutions per minute from drive motor 90. The use of a gear reducer 96 allows linear motion device 10 to position sliding block plate 30 more accurately. The gear reducer 96 is mounted directly to drive motor 90 and typically lies between drive motor 90 and bearing endcap 12. In an alternative embodiment, the gear reducer can be remotely located from drive motor 90. For most applications, a 5:1 to a 20:1 gear reduction is sufficient.

The use of stepper or servo motors insures the positional accuracy and repeatability of linear motion device 10 when used in conjunction with a motor controller 98. Accuracies of ±0.005 inches and repeatability of ±0.002 inches can be obtained when the present invention is driven by an open loop stepper system or a rotary encoder. When a closed loop endline linear encoder is used, accuracies of ±0.001 and repeatabilities of ±0.0005 can be obtained.

Figure 2:
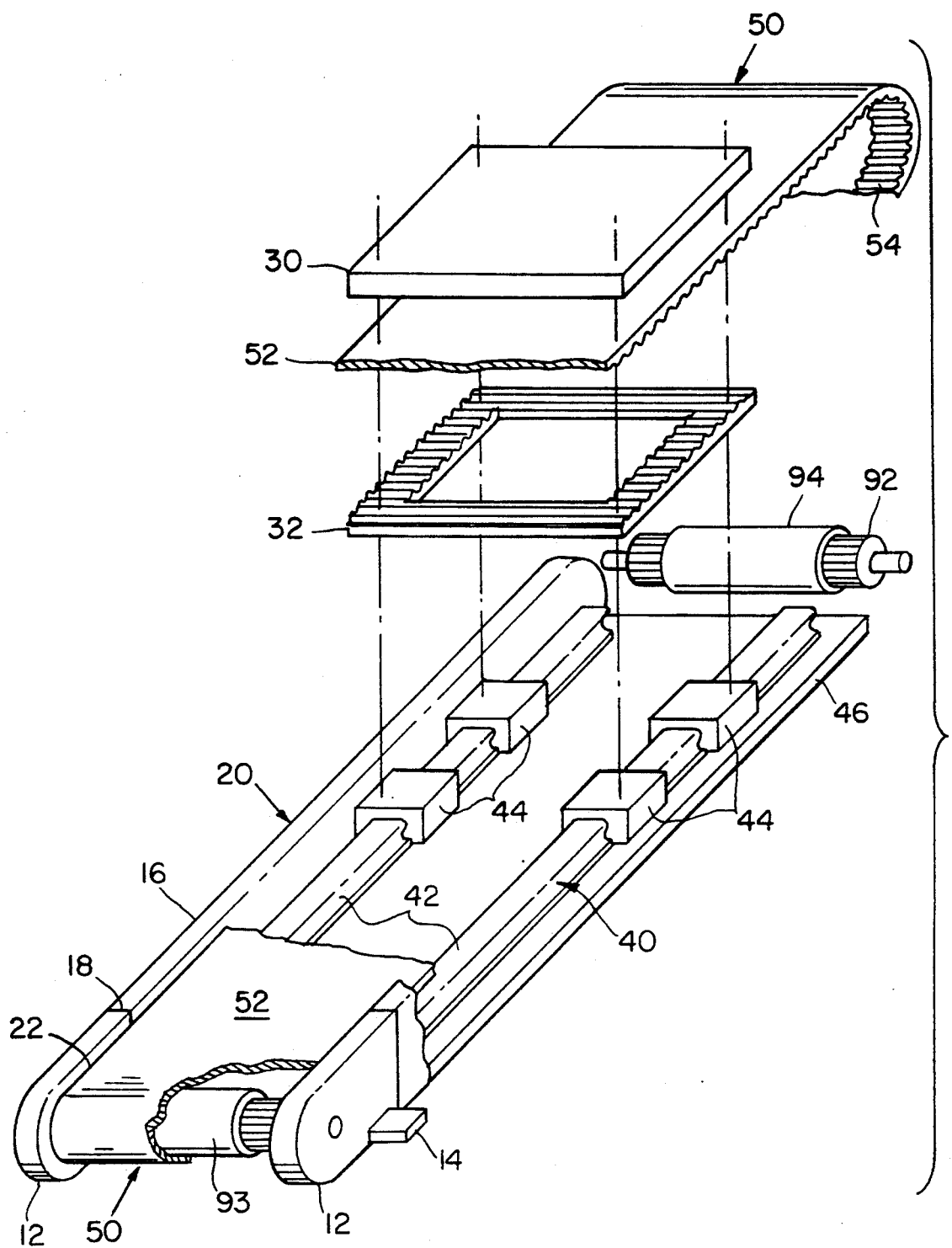
FIG. 2 is an exploded view of the linear motion device of FIG. 1 showing a slide rail system and manner of securing a drive belt to the rail system.

In FIG. 2, rail assemblies 40 are mounted to base plate 46. Each rail assembly 40 comprises a rail 42, and two sliding blocks 44. Generally, each rail assembly 40 is a linear bearing system. In the preferred embodiment, each rail assembly 40 is a THK LM System and in particular, a SR or HSR series linear bearing system. The SR system is for use in high radial loading applications while the HSR systems is for use in high moment loading applications. In the preferred embodiment, two rail assemblies 40 are used but in light applications one rail assembly 40 may be sufficient.

Tooth profile frame plate 32 has a frontal surface which faces and mounts to sliding block plate 30. The back surface of tooth profile frame plate 32 faces and attaches to surrounding sliding blocks 44 positioned around the periphery of frame plate 32. Drive belt 50 has timing belts 54 attached to the outer sides of the inner surface of drive belt 50. That inner surface of drive belt 50 lies on top of tooth profile frame plate 32, the teeth of timing belts 54 of drive belt 50 engaging the mating teeth of tooth profile frame plate 32. Sliding block plate 30 mounts on top of drive belt 50 sandwiching drive belt 50 between tooth profile frame plate 32 and sliding block plate 30. In the preferred embodiment, sliding block plate 30 is bolted to both tooth profile plate 32 and sliding blocks 44. In this manner, drive belt 50 is secured to rail assemblies 40.

Any motion by drive belt 50 causes movement of sliding blocks 44 along rails 42. Drive belt 50 passes over rail assemblies 40 and under base plate 46, encircling all the inner components (i.e., rail assemblies 40, base plate 46, tooth profile frame plate 32 and any internal electronic wiring/circuitry) of linear motion device 10. Rail assemblies 40 allow linear motion device 10 to move high loads in a linear direction with repeated accuracy. For example, loads up to 8000 pounds may be moved along the linear motion device 10.

Drive shaft 92 is mounted between a bearing endcap 12 of one side section assembly 20 and a facing endcap 12 of the other side section assembly 20. The end hubs of drive shaft 92 have a tooth profile matching that found on timing belt 54 of drive belt 50. Drive shaft 92 is supported by bearings housed in bearing endcaps 12. A second shaft 93 similar to the drive shaft 92 is located at the opposite end of linear motion device 10. This second shaft 93 is supported by bearings housed in bearing endcaps 12 at that end of device 10. This second shaft 93 is not driven. Sleeve 94 is located about the middle of drive shaft 92 and rides between timing belts 54 of drive belt 50. The purpose of sleeve 94 is to support and prevent drive belt 50 from mistracking.

Embodiments of the present invention shown in FIGS. 1 and 2 may be of different widths and lengths, depending upon the application. The present invention can be used for light load applications as a slide or for heavy duty applications as a positional table. On longer lengths, support rollers may be needed to prevent drive belt 50 from sagging. In applications where support rollers are required, the rollers contact the back (or inner) surface of the upper portion of drive belt 50 as well as the front (or outer) surface on the bottom portion of drive belt 50. Internal wiring can be installed within the interior of the present invention for applications where power needs to be supplied to sliding block plate 30. In applications where sliding block plate 30 travels over long distances, the internal wiring comprises a powered stationary exposed rail and a sliding brush. This arrangement provides power to sliding block 30 without using a flexible electrical cord.

Figure 3:
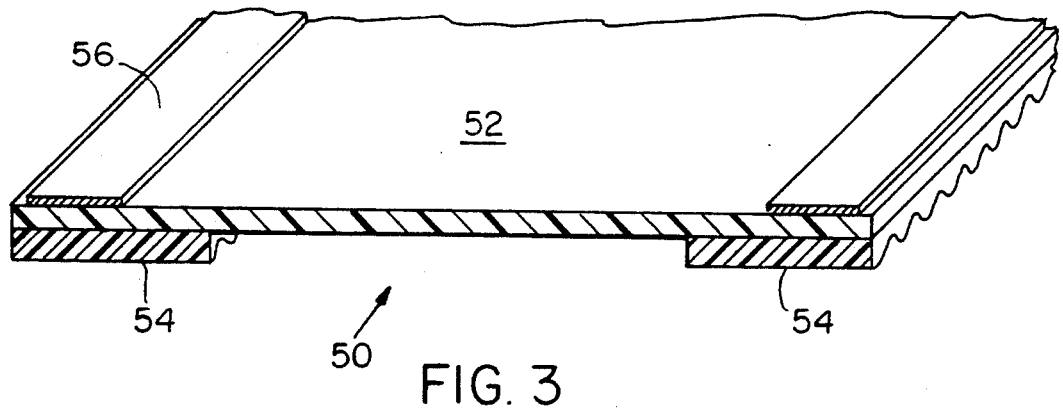
FIG. 3 is an end view of an embodiment of the drive belt having stainless steel bands on the top surface.

In FIG. 3, drive belt 50 is constructed by adhering timing belts 54 to the back surface of belting material 52 and by adhering metal bands 56 to the front or top surface of belting material 52. Timing belts 54 are preferably adhered to belting material 52 by means of a solvent. The solvent causes molecules of timing belts 54 to intermingle with molecules of belting material 52, chemically welding the materials together. The same solvent is mixed with an acid to adhere metal bands 56 to the front surface of belting material 52. Metal bands 56 can also be molded into or otherwise affixed to the surface of belting material 52.

Belting material 52 is generally made of surface ground food grade polyurethane having a thickness of about 1/16 to ¼ inch and a width from about 3 to 30 inches. Belting material 52 generally ranges from 88 to 96 durometer on the "A" scale. In particular, belting material ranging from 90-92 durometer is preferred.

Each metal band 56 is generally a stainless steel band made from 300 series stainless steel. In particular, 304 stainless steel having a surface finish ranging from 12-16 microinches is preferred although a surface finish ranging from 8-11 micro inches may be used. The width of metal band 56 ranges from about ⅜ to ½ inches, although in some cases metal band 56 may cover the full width of belting material 52. Generally the thickness of metal band 56 should be about 0.001 to 0.003 inches, with a thickness of 0.002 inches being preferred.

Each timing belt 54 is generally a steel reinforced polyurethane belt having a width ranging from about 50 mm to 100 mm. The pitch of timing belt 54 is usually either 5 mm, 10 mm, 0.500 inches or 0.200 inches. In the preferred embodiment, drive belt 50 has two timing belts adhered to the back surface spaced apart from each other, but in applications where drive belt 50 is narrow, one timing belt may be sufficient.

Figure 4:
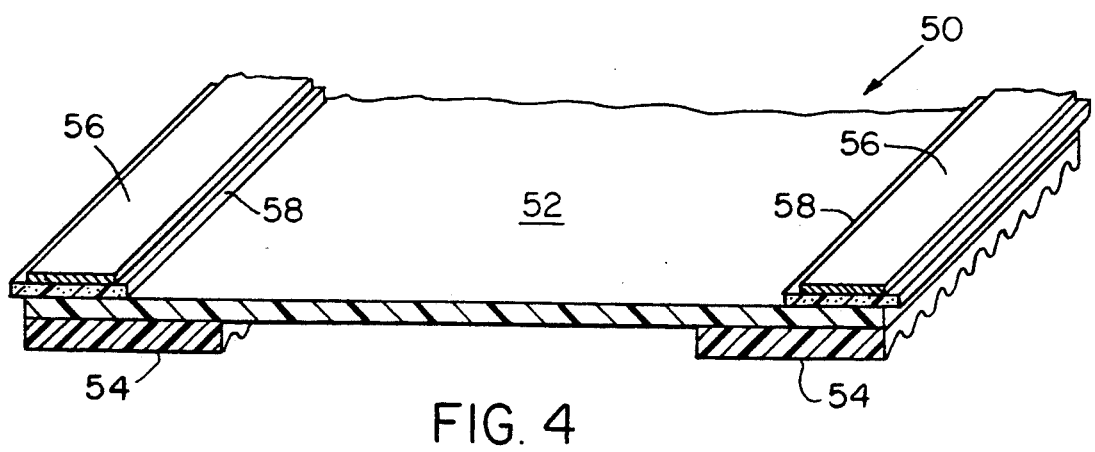
FIG. 4 is an end view of an alternative embodiment of the drive belt where cushions are placed under the stainless steel bands.

In FIG. 4, the belt construction is the same as that in FIG. 3 except that cushions 58 are sandwiched between belting material 52 and metal bands 56. Cushion 58 is generally about 1/16 to ⅛ inch thick with a thickness of 1/16 inch being preferred. Cushion 58 is made from softer material than belting material 52 and ranges from 20-40 durometer on the "A" scale. In the preferred embodiment, cushion 58 is made from polyurethane. The width of cushion 58 is slightly wider than metal band 56 and overhangs the outer edge of belting material 52. Cushion 58 compresses when under pressure and therefore can provide a tight sealing surface despite variations in belt material thickness and seal wear.

Figure 5:
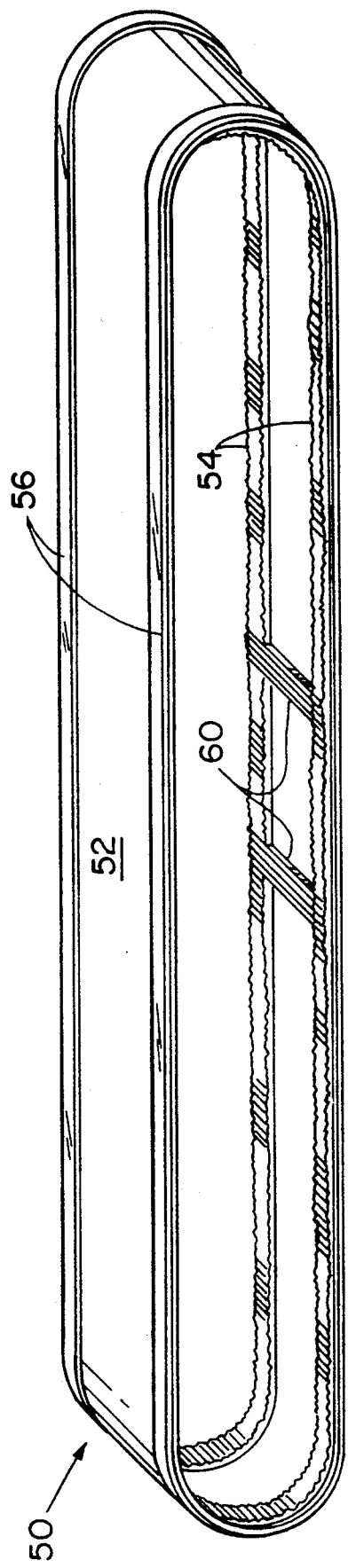
FIG. 5 is a perspective view of the drive belt with timing belt patches in place.

FIG. 5, shows drive belt 50 in its entirety. Drive belt 50 is butt welded to form an endless belt as shown. In an alternative embodiment, drive belt 50 can have two free ends. When drive belt 50 has two free ends, the free ends are sandwiched between tooth profile frame plate 32 and sliding block plate 30 as shown in FIG. 2. FIG. 5 also shows two timing belt patches 60 in place on the inner (i.e., back) surface of belting material 52 between timing belts 54. Timing belt patches 60 comprise timing belt material and are adhered to belting material 52 by means of a solvent. The purpose of timing belt patches 60 is to provide more teeth to engage with tooth profile frame plate 32 shown in FIG. 2.

Figure 6:
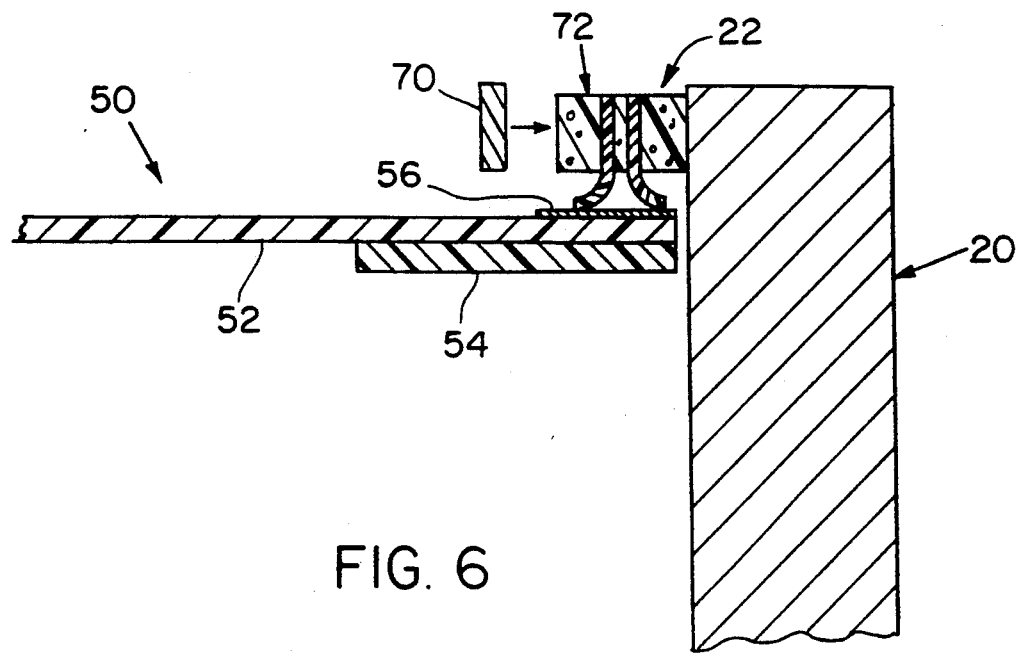
FIG. 6 illustrates a sealing arrangement for sealing a joint between a side section assembly and the drive belt.

FIG. 6 shows the sealing arrangement of joint 22 (shown in FIGS. 1 and 2) between side section assemblies 20 and drive belt 50 for applications where the inner components of linear motion device 10 need to remain free from liquids or contaminants. The sealing is provided by double redundant seals 72 along the two opposite sides of drive belt 50 forming joints 22 with side section assemblies 20. For each joint 22, a seal 72 is fastened to the associated side section assembly 20 by means of clamp 70. Typically, clamp 70 has clearance holes allowing screws to fasten clamp 70 to the side section assembly 20, trapping and securing seal 72 in place. Clamp 70 is made from either stainless steel or anodized aluminum. Seal 72 presses against metal band 56 of drive belt 50 sealing the joint 22 between side section assembly 20 and drive belt 50. This sealing arrangement seals out liquids and other contaminants from entering the interior of the present invention. A shield can be employed on the exterior side of seal 72 for extra protection. Seal 72 is typically made from polyurethane impregnated with polytetrafluoroethylene (PTFE). Generally, PTFE impregnated polyurethane comprising 15%-20% PTFE and 80%-85% polyurethane by weight is used. Seal 72 can also comprise virgin PTFE. Seal 72 generally comprises a singular piece of material but can comprise a plurality of pieces making up a single seal as illustrated by the following alternatives to seal 72.

Figure 7:
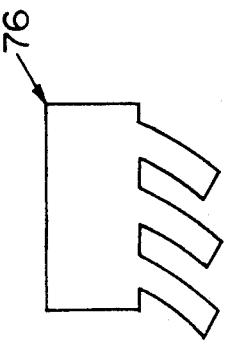
FIG. 7 is a schematic view of a seal having a single wiper for sealing the joint between the side section assembly and the drive belt.

Single wiper seal 74 from FIG. 7 can be used in place of seal 72 in FIG. 6. Seal 74 is secured to side section assembly 20 by clamp 70. Alternatively, seal 74 can be secured by being inserted into a groove in the surface of side section 20. Seal 74 can be made either from virgin PTFE or PTFE impregnated polyurethane.

Figure 8:
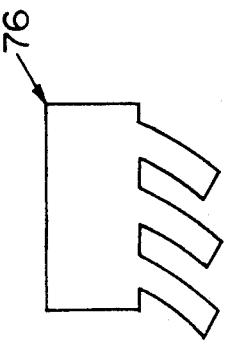
FIG. 8 is a schematic view of a treble wiper seal for sealing the joint between the side section assembly and the drive belt.

Treble wiper seal 76 from FIG. 8 can be used in place of seal 72 in FIG. 6. Clamp 70 secures seal 76 to side section 20. Alternatively, seal 76 can be secured by insertion into a groove in the surface of side section 20. Seal 76 can be made either from virgin PTFE or PTFE impregnated polyurethane.

Figure 9:
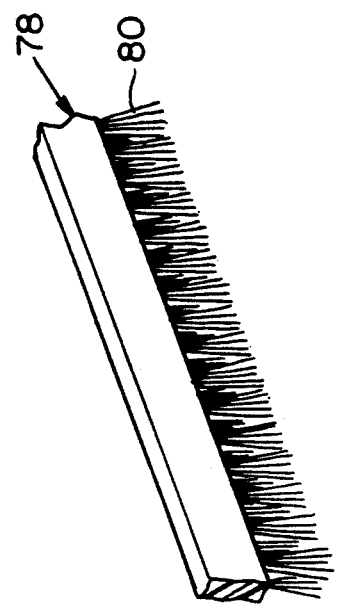
FIG. 9 is a schematic view of a brush seal for sealing the joint between the side section assembly and the drive belt.

Brush seal 78 from FIG. 9 can be used in place of seal 72 in FIG. 6 in applications for preventing contaminants such as dust or dirt from entering the interior of the present invention. Brush seal 78 has bristles 80 extending downward in rows. Bristles 80 are typically nylon bristles. Brush seal 78 is secured to side section assembly 20 by clamp 70. Alternatively, brush seal 78 can be secured by insertion into a groove in side section assembly 20. Bristles 80 ride on the surface of metal band 56 of drive belt 50 preventing contaminants from entering the interior of the present invention. More than one row of bristles can be employed by brush seal 78, and more than one row of brush seals 78 can be used.

In applications where linear motion device 10 is submersed in a liquid or is subjected to constant washdowns, the interior of linear motion device 10 can be pressurized with compressed air to insure that no liquids enter the interior of linear motion device 10. Typically, a pipe fitting is installed to side section assembly 20 allowing a compressed air line to be connected to linear motion device 10. Additionally, in submersible applications, a liquid submersible drive motor is used. When only the top surface of linear motion device 10 is subjected to liquids or contaminants, sealing of only the top surfaces is suitable.

In clean room applications, a shield and a high flow vacuum can be employed to prevent particles from escaping from the present invention device 10. Typically, when a shield and a high flow vacuum are employed, a stainless steel shield replaces clamp 70 shown in FIG. 6. The shield is secured to side section assembly 20. No seal is employed in this arrangement. The stainless steel shield is positioned so that a small gap separates the shield and drive belt 50. Additionally, in clean room applications a sheet of PTFE may cover the surface of drive belt 50.

Figure 10:
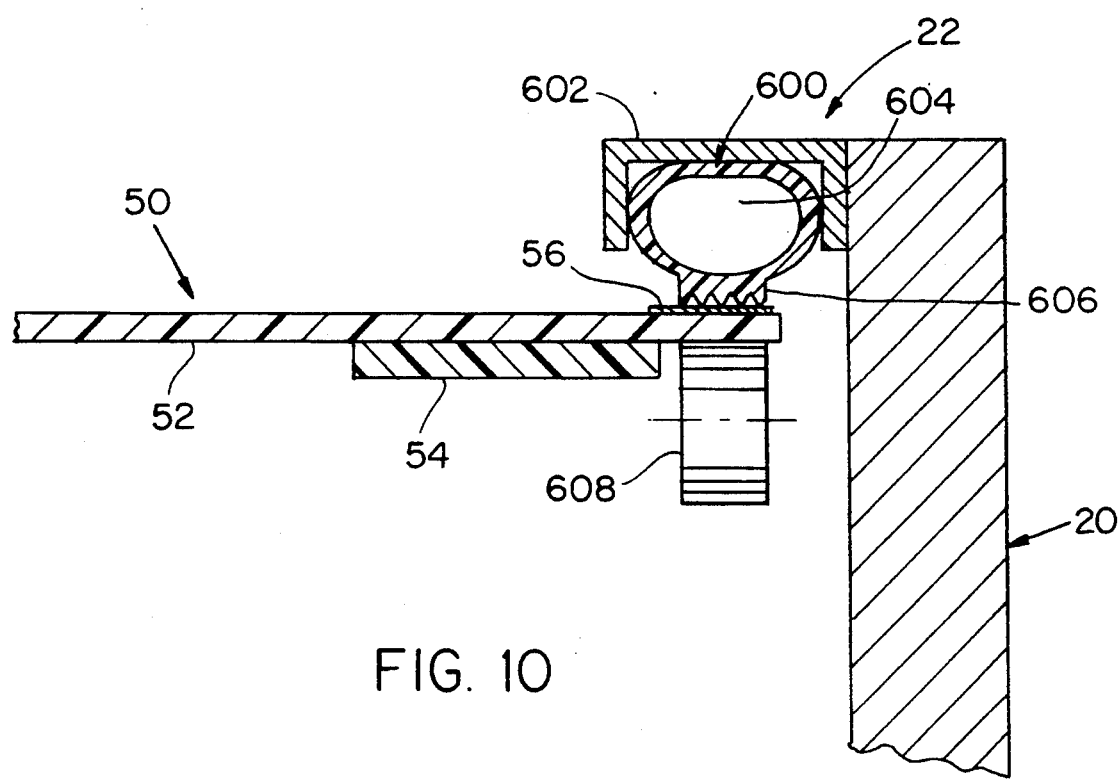
FIG. 10 illustrates a sealing arrangement for the joint between the side section assembly and the drive belt using an inflatable seal on the top surface of the drive belt.

In FIG. 10, inflatable seal 600 is used to seal joints 22 (shown in FIGS. 1 and 2) between the outer opposite sides of drive belt 50 and side section assemblies 20. Generally, inflatable seal 600 is made from an elastomer. In particular, fluoroelastomers such as viton are preferred but other materials such as neoprene, butyl, or nitrile can be used.

Inflatable seal 600 sits within seal seat 602. The purpose of seal seat 602 is to provide stability and to direct the expansion of inflatable seal 600 in a specified direction. Seal seat 602 can be of various configurations, but is typically a channel as shown in FIG. 10 where the direction of expansion of inflatable seal 600 is directed downward onto drive belt 50. Seal seat 602 is made from either anodized aluminum or stainless steel. Seal seat 602 is secured to side section assembly 20.

Cavity 604 of inflatable seal 600 is inflated with either a liquid or a gas. A liquid is desirable for applications where heat must be dissipated. Generally, air is used to inflate inflatable seal 600. An air pump or compressor is used to inflate inflatable seal 600 with air. In applications where the present invention is submersed in a liquid, a pressure differential may exist between the interior of the present invention and the surrounding conditions. Pressures 20-30 psi more than the pressure differential are used to inflate inflatable seal 600. Additionally, constant pressure within inflatable seal 600 can be maintained by means of a compressed air line feeding into inflatable seal 600 through a pressure regulator.

When inflatable seal 600 is inflated, sealing surface 606 presses against metal band 56 of drive belt 50, sealing the area between them. Sealing surface 606 can be a flat surface. Generally, sealing surface 606 has a plurality of ridges or wipers. Sealing surface 606 can be made of the same material as the rest of inflatable seal 600 or it can be of a different material such as PTFE or PTFE impregnated polyurethane.

When using inflatable seal 600, the edges of drive belt 50 are supported on the inner (back) surface directly opposite inflatable seal 600. A series of support rollers 608 are used to support drive belt 50 on the inner (back) surface. Timing belts 54 are positioned so that support rollers 608 contact belting material instead of contacting timing belts 54. Support rollers 608 rotate about cantilevered or simply supported shafts. Support rollers comprise either metal or plastic and generally house roller or ball bearings.

Figure 11:
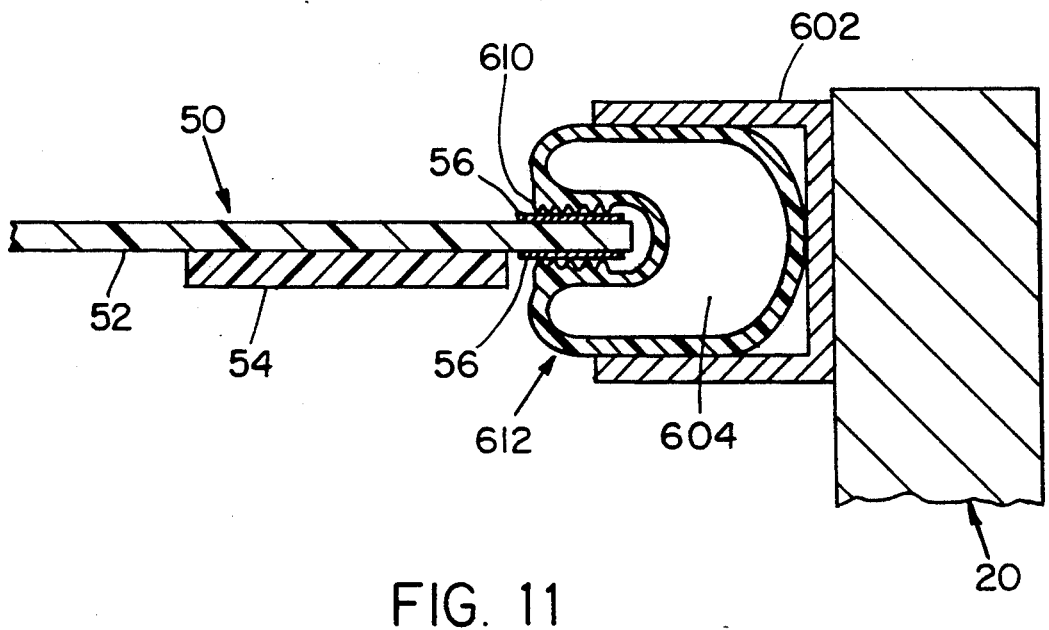
FIG. 11 illustrates a sealing arrangement for the joint between the side section assembly and the drive belt using an inflatable seal on the edge of the drive belt.

In FIG. 11, inflatable edge seal 612 is wrapped about the edge of drive belt 50. Inflatable edge seal 612 sits within seal seat 602 in similar fashion as that shown in FIG. 10 and seal seat 602 is secured to side section assembly 20. Inflatable edge seal 612 has two seal surfaces 610 which press against the front (top) and back surfaces of drive belt 50 when inflatable edge seal 612 is inflated. Drive belt 50 has metal bands 56 on the front and back surfaces near the edges of drive belt 50. Timing belt 54 is positioned to allow metal band 56 to be near the edge of drive belt 50. Seal surfaces 610 contact the front side surface and back side surface metal bands 56 simultaneously.

Figure 12:
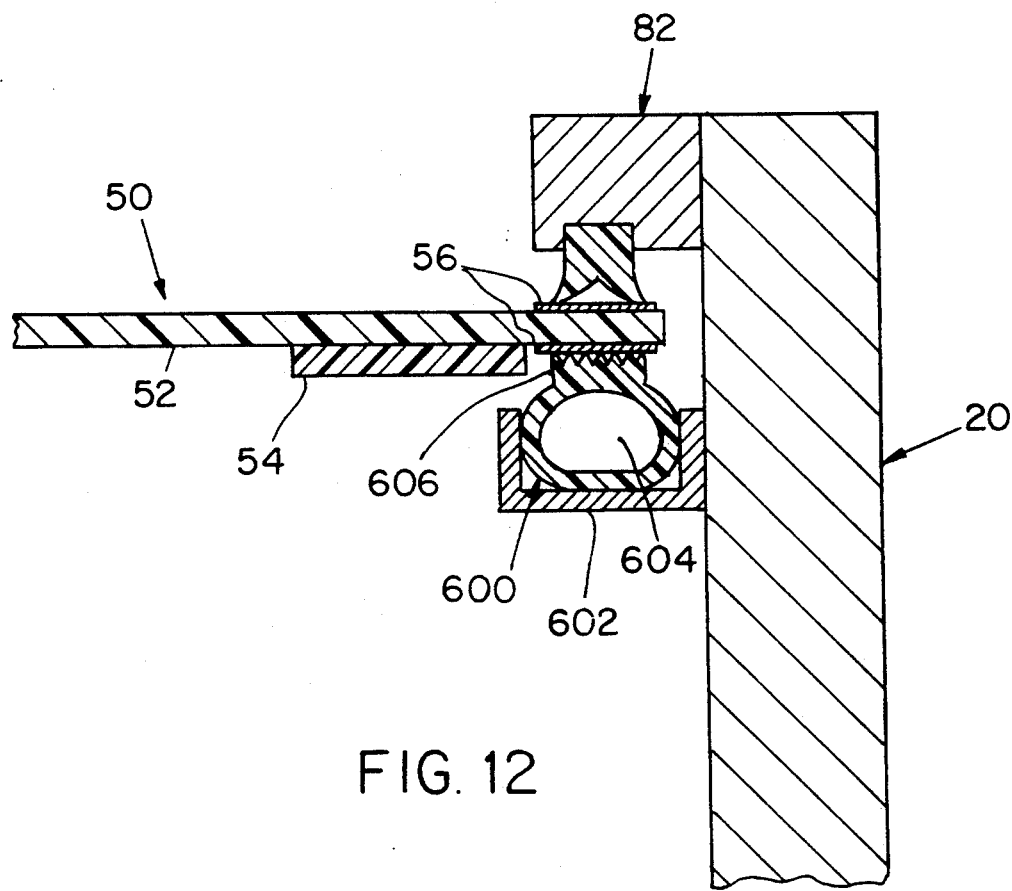
FIG. 12 illustrates a sealing arrangement for the joint between the side section assembly and the drive belt using an inflatable seal on the bottom surface of the drive belt.

In FIG. 12, inflatable seal 600 and seal seat 602 are the same as shown in FIG. 10 except that seal surface 606 of inflatable seal 600 contacts metal band 56 on the back surface of drive belt 50. Seal seat 602 is secured to side section assembly 20. Seal assembly 82 is much like the sealing arrangement 72 shown in FIG. 6 and can be used to provide additional support and sealing on the outer (front) surface of drive belt 50. When seal assembly 82 is used, drive belt 50 has the same configuration as that shown in FIG. 11 where metal bands 56 are on the frontal and back surfaces near the edge of drive belt 50. Seal assembly 82 is secured to side section assembly 20.

In FIG. 13, sealed conveyor 100 of the present invention is similar to linear motion device 10 except that there is no slide rail system and no sliding block plate assembly. What remains is the belt drive system and the sealing arrangement at joints 22 between side section assembly 20 and drive belt 50. Additionally, rollers are added to prevent drive belt 50 from sagging under its own weight or the weight of any objects being transported on drive belt 50. Sealed conveyor 100 is driven continuously by drive motor 90 and is used to continuously transport objects along drive belt 50. A constant speed AC motor is used to drive sealed conveyor 100. Optionally, the surface of drive belt 50 may be partitioned by a plurality of raised bumps 102 on the surface of drive belt 50. Raised bumps 102 aid in the transportation of objects along sealed conveyor 100, especially when sealed conveyor 100 is on an angle.

Figure 14:
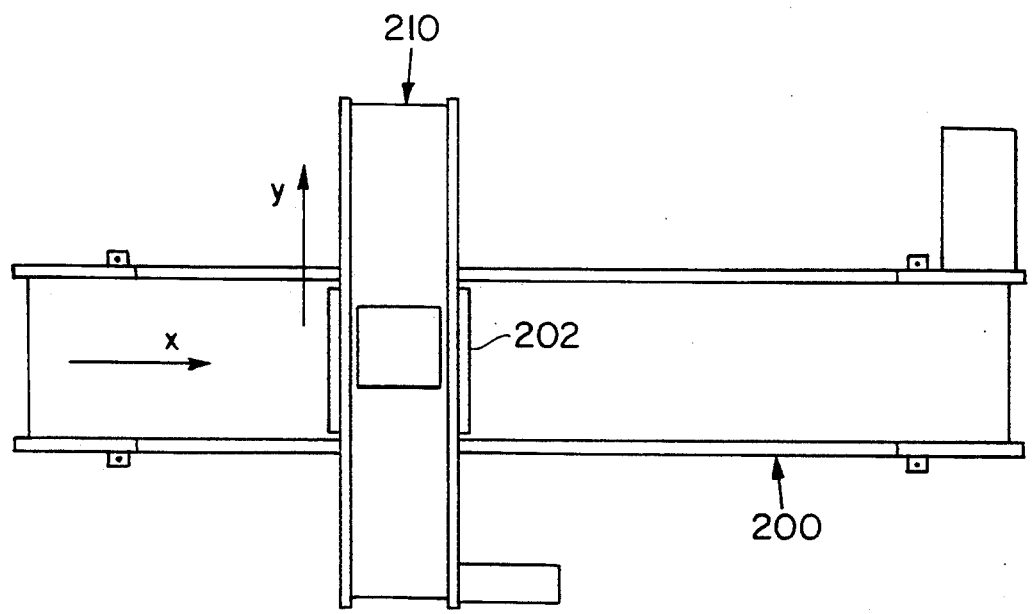
FIG. 14 is a top view of two linear motion devices of the present invention positioned in a multi-axis configuration.

In FIG. 14 linear motion device 210 is mounted to sliding block plate 202 of linear motion device 200. Linear motion device 210 is usually positioned so that the direction of motion of linear motion device 210 is different than the direction of motion of linear motion device 200. Linear motion device 210 can be positioned perpendicular to linear motion device 200 to form an X-Y table. More than two linear motion devices can be mounted to each other in a similar fashion. For instance, a third linear motion device may be mounted to the configuration shown in FIG. 14 to form an X-Y-Z table, the third linear motion device having motion along the vertical axis.

Figure 15:
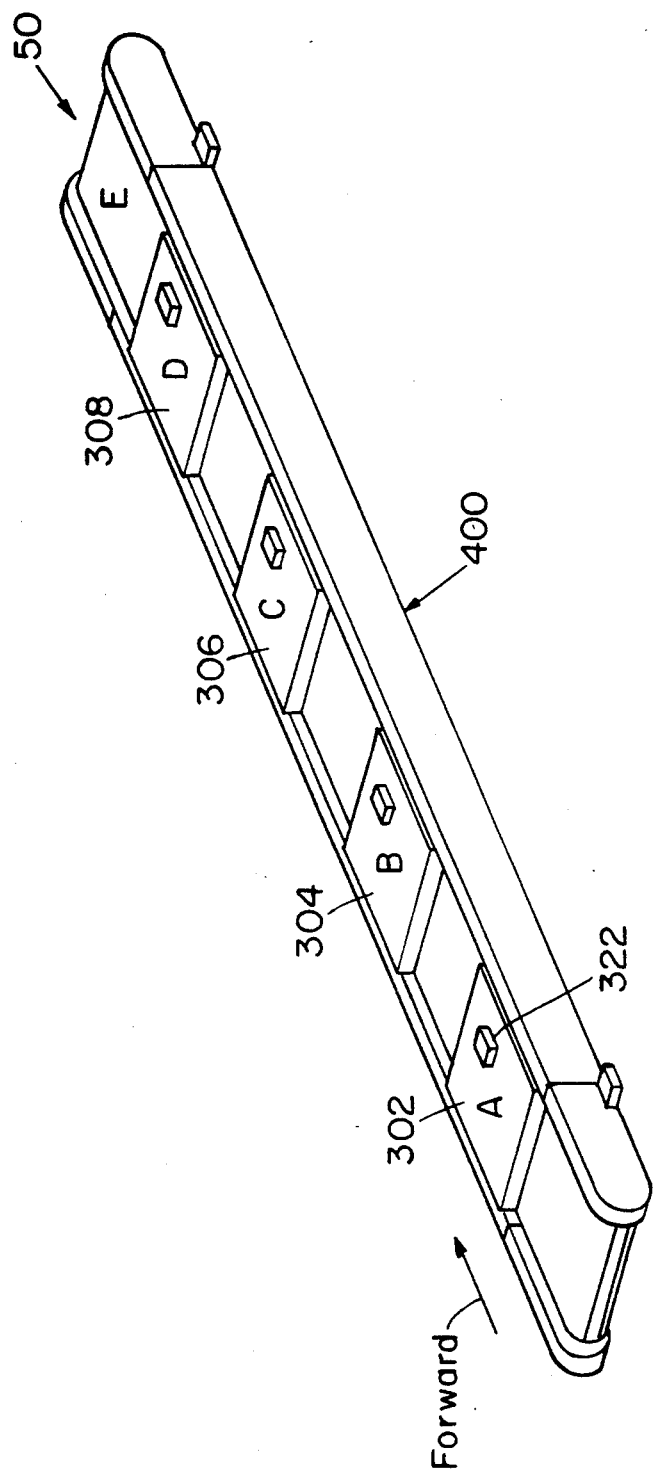
FIG. 15 is a perspective view of a linear motion device of the present invention set up in a walking beam configuration.

In FIG. 15 a plurality of sliding block plates are mounted to the surface of drive belt 50 to form walking beam device 400. A walking beam may be used in applications where separate operations are performed upon an object at separate locations. In the walking beam application shown in FIG. 15, when drive belt 50 is moved forward, sliding block plate 302 at position "A" moves to position "B," sliding block plate 304 moves to position "C," sliding block plate 306 moves to position "D," and sliding block plate 308 moves to position "E." When the sliding block plates are moved forward, any object located on the sliding block plates moves forward. When sliding block plate 302 is moved forward, object 322 on sliding block plate 302 is carried from position "A" to position "B." After object 322 is carried to position "B" from position "A," an external mechanism holds and keeps object 322 at position "B" and performs an operation on object 322. To perform an operation on object 322, the external mechanism lifts object 322 off sliding block plate 302. An empty sliding block plate 302 then moves backwards from position "B" to position "A" and sliding block plate 304 moves back from position "C" to position "B." When the external mechanism finishes performing the operation on object 322, object 322 is then placed onto sliding block plate 304 now at position "B." Sliding block plate 304 then moves object 322 forward from position "B" to position "C" where further operations are performed on object 322 in a similar manner (i.e., by being lifted off sliding block plate 304 at position "C" and subsequently placed onto a new sliding block plate at position "C" moving to position "D"). By continuing this succession of forwards-backwards movements of the sliding block plates, object 322 moves from position "A" to position "E" in progressive steps.

While this invention has been particularly shown and described with references to preferred embodiments thereof, it will be understood by those skilled in the art that various changes in form and details may be made therein without departing from the spirit and scope of the invention as defined by the appended claims. For example, although reference is made to embodiments of the invention as a linear motion device, reference as a positional table is synonymous.

I claim:

1. A linear motion apparatus comprising:
   a moveable surface moveable along a lateral axis, the moveable surface being an outer surface of an endless drive belt, said drive belt being driven by a belt drive assembly;
   stationary first and second side members, the first side member adjacent to one side of the moveable surface and the second side member adjacent to an opposite side of the moveable surface, and the first and second side members extending along axes parallel to the lateral axis of the moveable surface; and
   a seal for sealing the moveable surface to the side members, such that a combination of the seal, side members and moveable surface totally enclose the belt drive assembly.

2. The linear motion apparatus of claim 1 wherein the drive belt comprises at least one timing belt on the inner surface of the drive belt.

3. The linear motion apparatus of claim 1 wherein:
   the seal includes first and second sealing members, the first sealing member connected to the first side member and the second sealing member connected to the second side member; and
   the drive belt comprises at least one sealing band attached to the outer surface of the drive belt for contacting the first and second sealing members.

4. The linear motion apparatus of claim 3 wherein the sealing band is metallic.

5. The linear motion apparatus of claim 3 wherein the first and second sealing members are made of a polymer.

6. The linear motion apparatus of claim 1 wherein the belt drive assembly comprises:
   a drive pulley coupled to the drive belt proximate to a first end of the apparatus; and
   a second pulley coupled to the drive belt proximate to a second end of the apparatus opposite the first end.

7. The linear motion apparatus of claim 6 wherein the belt drive assembly is driven by a drive motor coupled to the drive pulley for turning the drive pulley.

8. The linear motion apparatus of claim 7 wherein the drive motor is coupled to the drive pulley by a gear reducer.

9. The linear motion apparatus of 7 wherein the drive motor is coupled to the drive pulley in a manner for moving the moveable surface at a substantially constant rate of speed.

10. The linear motion apparatus of claim 6 further comprising:
    a linear slide comprising at least one block sliding on a rail, said linear slide being within the belt drive assembly;
    a plate on the moveable surface coupled through the thickness of the drive belt to the linear slide;
    a motor controller for controlling the movement of the plate to a predetermined position.

11. The linear motion apparatus of claim 6 wherein the belt drive assembly further comprises rollers between the pulleys for supporting the drive belt.

12. The linear motion apparatus of claim 1 wherein the seal comprises inflatable sealing members.

13. The linear motion apparatus of claim 1 wherein the seal comprises first and second sealing members, each of said sealing members contacting the moveable surface and connected to one of the first and second side members.

14. The linear motion apparatus of claim 13 wherein the first and second sealing members are made of a polymer.

15. The linear motion apparatus of claim 13 wherein the moveable surface comprises at least one sealing surface attached to the moveable surface such that the first and second sealing members contact the sealing surface.

16. The linear motion apparatus of claim 15 wherein the sealing surface is metallic.

17. The linear motion apparatus of claim 1 further comprising a plate mounted to the moveable surface for supporting items to be transported.

18. A method of providing linear motion comprising the steps of:

providing a moveable surface moveable along a lateral axis, the moveable surface being an outer surface of an endless drive belt;

driving the drive belt with a belt drive apparatus;

providing first and second side members spaced across from and adjacent to the moveable surface at opposite sides of the moveable surface, and the first and second side members extending along axes parallel to the lateral axis of the moveable surface; and sealing the moveable surface to the side members, such that a combination of the seal, side members and moveable surface totally enclose the belt drive assembly.

19. The method of claim 18 wherein the step of sealing comprises:

coupling a first sealing member to the first side member, and coupling a second sealing member to the second side member; and contacting the moveable surface with the first and second sealing members.

20. The method of claim 19 wherein the step of sealing further comprises attaching at least one sealing band to the moveable surface such that the first and second sealing members contact the sealing band.

21. The method of claim 18 further comprising the step of positioning the moveable surface in a desired position.

22. The method of claim 18 further comprising moving the moveable surface at a substantially constant rate of speed.

23. A linear motion apparatus comprising:

a moveable surface moveable along a lateral axis, the moveable surface being an outer surface of an endless drive belt;

stationary first and second side members, the first side member adjacent to one side of the moveable surface and the second side member adjacent to an opposite side of the moveable surface, and the first and second side members extending along axes parallel to the lateral axis of the moveable surface;

a seal for sealing the moveable surface to the side members, a belt drive assembly substantially enclosed by the drive belt and for driving the drive belt of the moveable surface, the belt drive assembly including a) a drive pulley coupled to the drive belt proximate to a first end of the apparatus, b) a second pulley coupled to the drive belt proximate to a second end of the apparatus opposite the first end, and c) a linear slide comprising at least one block sliding on a rail;

a plate on the moveable surface coupled through the thickness of the drive belt to the linear slide; and a drive motor coupled to the drive pulley for turning the drive pulley;

a motor controller for controlling the movement of the plate to a predetermined position.

* * * * *